Dec. 4, 1962 T. BUDZICH Re. 25,294
CONSTANT SPEED DRIVE
Original Filed Oct. 1, 1959
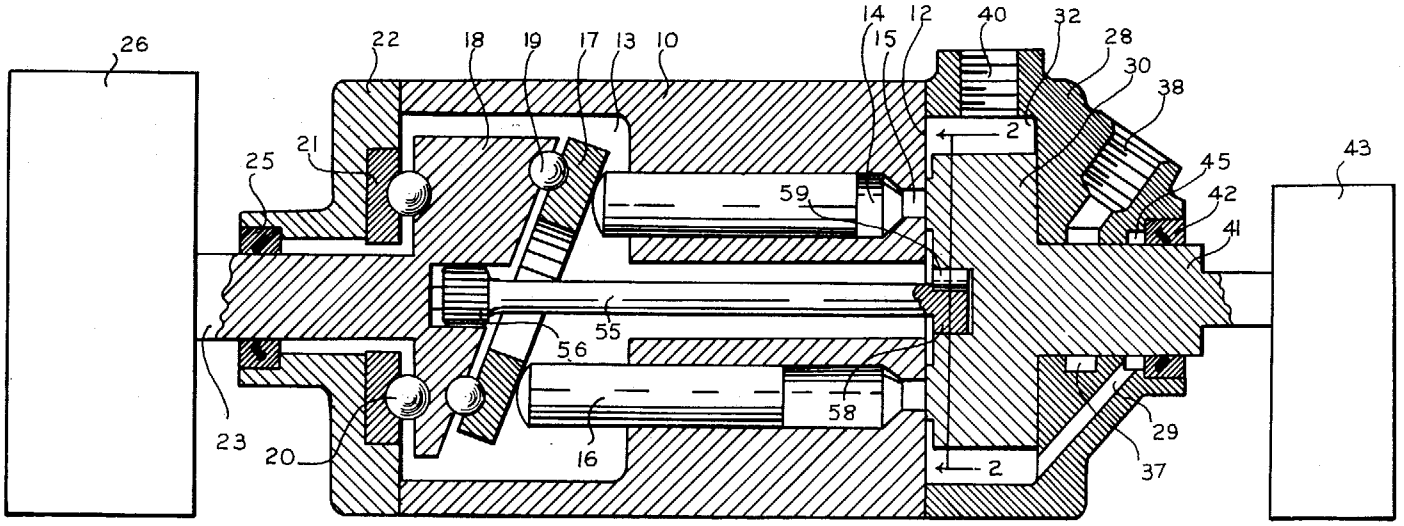
FIG. 1
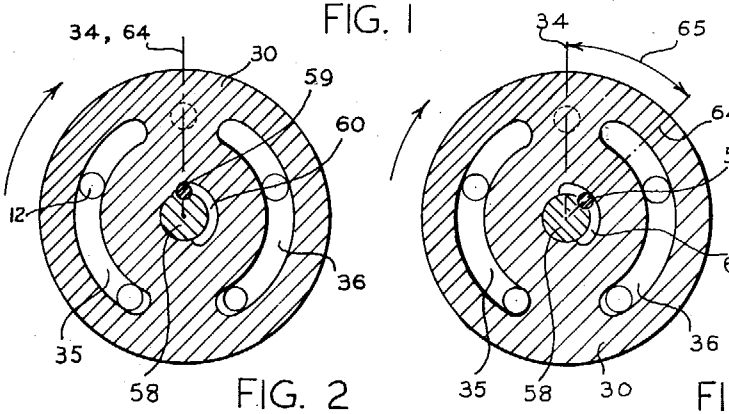
FIG. 2
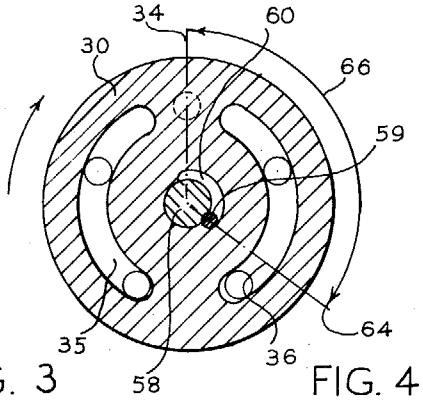
FIG. 3
FIG. 4
INVENTOR.
TADEUSZ BUDZICH
BY Richard MacCutcheon
Atty.

United States Patent Office

Re. 25,294
Reissued Dec. 4, 1962

25,294
CONSTANT SPEED DRIVE

Tadeusz Budzich, 3344 Colwyn Road,
Shaker Heights, Ohio

Original No. 2,979,037, dated Apr. 11, 1961, Ser. No. 843,875, Oct. 1, 1959. Application for reissue Apr. 26, 1962, Ser. No. 193,045
17 Claims. (Cl. 121—119)

Matter enclosed in heavy brackets [ ] appears in the original patent but forms no part of this reissue specification; matter printed in italics indicates the additions made by reissue.

This invention relates generally to fluid apparatus and has particular significance in connection with controlled speed fluid transmissions having a pressure fluid motor of the stationary cylinder barrel piston type.

There are several methods, known in the art, by which the speed of the fluid motor can be controlled, irrespective of variation in driven load.

In one solution motor speed is varied by change in volume output of a pump supplying fluid under pressure to the motor. Usually this is accomplished by connecting pump and motor in a closed circuit and driving the pump from an independent power source. This commonly known form of variable speed fluid transmission drive suffers from serious disadvantages especially when an exact control of output speed of fluid motor is required. This type of drive needs a separate pump to drive just one fluid motor together with an elaborate control which automatically varies the displacement of the pump and oftimes also of the motor, or of both, to maintain the required speed of the output shaft. Especially for high response and accurately controlled fluid transmissions these controls become excessively complicated and unreliable and the pump motor combination is heavy and expensive.

Another solution employs a fluid motor, the output speed of which is regulated by a fluid throttling device operated by a speed governor driven from the motor output shaft. This machine is considerably less complicated and expensive than the one mentioned above, and at the same time it is more flexible in its application since it can be positioned at any point in the fluid power circuit. It suffers, however, from serious disadvantages due to its inherent inefficiency at low power level outputs. To maintain constant speed the motor must be supplied with a constant flow of fluid at high pressure and therefore it uses a constant horsepower input while the driven load may vary from zero to maximum input requirement.

Still another solution employs merely a variable displacement motor connected to a fluid pressure circuit. In such a motor the output speed is regulated by an automatic control sensing the drive shaft speed and accordingly changing the motor displacement. Although this type of drive is less complicated than the transmission employing a controlled pump and motor and more efficient than the throttle controlled drive as described above, its stroke changing mechanism and control elements usually include speed governor, fluid actuator and moveable cam which still makes this solution complicated and expensive.

It is an object of the present invention to provide simple and inexpensive means for overcoming the above mentioned difficulties.

Another object is to provide a new and simplified form of fluid drive arranged to be accurately controlled without any devices for operating displacement changing mechanism or for throttling the input fluid.

A further object is to provide a fluid drive which when connected to a source of pressurized fluid will automatically adjust its displacement to magnitude of the required torque.

A further object is to provide a fluid drive which will maintain the average speed of output shaft at high or variant torque equal to the speed of an input shaft driven at low torque and with low power, regardless of whether this requires acceleration or braking of the output load.

Other objects and advantages of the present invention will be apparent from the following description, reference being had to the accompanying drawing showing clearly a preferred embodiment, in which:

FIG. 1 is a horizontal section view of a fluid motor with a timing plate drive and a driven load shown diagrammatically;

FIG. 2 is a sectional view taken along the line 2—2 of FIG. 1 and through the motor timing mechanism;

FIG. 3 is a sectional view as in FIG. 2 but with motor cam leading the timing mechanism so that the motor is in reduced displacement position as hereafter described; and FIG. 4 is a sectional view as in FIGS. 2 and 3 but with the motor cam leading the timing mechanism in reverse drive position.

DESCRIPTION

In FIG. 1 there is shown a fluid motor having a body 10 which at one end terminates in a flat face 12 and at the other end has a tubular extension enclosing a space 13. The body has a series of longitudinal cylinder bores 14 concentrically arranged around a longitudinal axis of the fluid motor and in direct communication through openings 15 with space beyond the flat face 12. Pistons 16 slidably engage cylinder bores 14 and have part-spherical ends which work in operational contact with a reaction plate 17 guided on a cam plate 18 by a series of balls 19. The cam 18 working in the space 13 in turn is guided by a series of balls 20 engaging a circular track in a bearing race 21 provided in a shaft cover 22.

The cam plate 18 has a shaft extension 23 sealed by a shaft seal 25 and works in driving engagement with a driven load shown only diagrammatically at 26. The shaft cover 22 is secured to the fluid motor body 10 as by bolts not shown while a valve plate cover 28 is positioned against the flat face 12 of the fluid motor body 10 and is suitably secured to it as by bolts not shown. A rotary valve plate 30 works in a space 32 provided in the valve plate cover 28 and engages the flat face 12 and is thus in communication with the cylinder bores 14 through passages 15. The rotary valve plate 30 is so constructed that a vertical center line 34 (see FIG. 2) divides it into inlet and outlet sectors 35, 36. The high pressure inlet sector (for example 35) of the rotary valve plate 30 is in direct communication, through passages not shown, with a collector ring (space) 37 leading to a port 38. The low pressure outlet sector (for example 36) communicates directly with the space 32 (through passage means not shown) and thus with a low pressure exhaust port 40 provided in the valve plate cover 28. The rotary valve plate 30 has a cylindrical shaft extension 41 sealed by a shaft seal 42 and is driven by a rotating control 43, shown diagrammatically. An annular ring 45 may be vented to protect the shaft seal 42 from high pressure fluid.

A central control shaft 55 at one end has a spline 56 engaging corresponding splines in the cam plate 18 while at its other end shaft 55 is cylindrical at 58 and operates in a suitable opening with a roller 59 free to slide in an arcuate groove 60 (e.g., of 172° as shown in FIG. 2) around the opening, and through the medium of this clearance drive the control shaft 55 and the valve plate 30 are rotatably connected.

The details of the construction of the rotary valve plate 30 as shown in FIGS. 1, 2, 3 and 4 are given only to demonstrate the basic principle of the invention. The actual construction of the valve plate 30 may vary without departing from the true spirit of the invention but preferably this valve plate divides the stationary cylinder barrel and motor pistons working in it into approximately equal high pressure inlet and low pressure outlet zones, the line (34) dividing these zones rotating in phase with control 43 while the valve mechanism connects the motor pistons with the inlet and outlet zones in timed relation with the rotation of said control.

OPERATION

In operation the cylinder bores 14 of the fluid motor are sequentially connected by the timing mechanism to high and low pressure oil. The pistons 16, while subjected to high pressure oil, will have their spherical ends engaging the reaction plate 17. The force of engagement will be transmitted from the reaction plate 17 through the balls 19 to the cam plate 18. A component of the hydraulic forces acting on the inclined plane of the cam 18 will produce a torque which will be transmitted through the drive shaft 23 to the driven load 26. Meanwhile reaction plate 17 is subjected to a wobbling motion which minimizes the relative movement between highly loaded areas of contact of part-spherical ends of pistons 16 and the flat face of the reaction plate 17.

During the power stroke each piston 16 involved is kept against reaction plate 17 by the high pressure oil. During return stroke each piston 16 is kept in contact with the reaction plate 17 by the pressure differential existing between the motor exhaust zone 32 and space 13, which is assumed directly connected to an oil reservoir (not shown). In FIG. 1 the cam plate 18 is shown in the plane giving maximum angular inclination. This plane can be defined as one containing the principal axis of the cam plate 18. A section through the cam 18 either to the left or to the right of said principal axis will show smaller angular inclination of the cam plate. A section disposed at 90° to the principal axis will show zero cam plate inclination as related to the back face of the cam or the adjacent face of shaft cover or race 21.

The timing mechanism includes the rotary valve plate 30 equipped with kidney shaped ports 35 and 36 as shown in FIG. 2. Depending on the direction of rotation of the cam plate 18 either port 36 or 35 may be connected to the high pressure oil. With the direction of rotation as shown by the arrow (see FIG. 2) and with the cam plate 18 located as shown in FIG. 1 the port 35 is subjected to high pressure oil and the port 36 to low pressure oil. In FIG. 1 plus 2 the principal axis of the cam plate 18 coincides with the line 34 which divides the timing mechanism into high pressure and low pressure sectors. During operation the timing mechanism connects high and low pressure oil to the respective cylinder bores of the stationary cylinder barrel, as dictated by the high and low pressure sectors of the valve plate. The pressure induces hydraulic forces acting on the pistons 16. These forces acting on the inclined plane of cam plate 18 can be resolved into axial and transverse components. The axial components of these hydraulic reaction forces are directly carried by balls 20. The transverse (vertical in FIG. 1) components of the hydraulic reaction forces with cam plate 18 principal axis 64 as shown in FIG. 2 are positioned on an arc extending on one side of the principal axis. Each of these transverse components, acting on a moment arm around the center of rotation of the cam plate 18, transmits a driving torque to driven load 26. The sum of these component moments constitutes the useful total torque of the hydraulic motor. The further each piston is positioned, at an instant, from the principal axis of the cam the higher its moment and higher its torque transmitted to the cam plate. Two pistons, as shown in FIG. 1, positioned along the principal axis of the cam will induce a zero torque, their moment arm to the axis of rotation being zero. When disposing angularly the valve axis 34 and this cam plate principal axis designated as 64 in FIGS. 2–4, for example 45° as shown by angle 65 in FIG. 3, some of the pistons subjected to high pressure oil are moved to the other side of the principal axis of the cam, reducing the torque output of the hydraulic motor. The maximum torque of the motor will occur with all the pistons subjected to pressure positioned at one side of the principal axis of the cam plate. With such pistons positioned on both sides of the principal axis due to different orientation, some of the moments inducing rotation will cancel each other. The torque generated by the pistons acting on one side of the principal axis of the cam is opposed by the torque generated by the pistons positioned on the opposite side of the principal axis. Only the net torque equal to the difference of the moments then will be transmitted to the drive shaft 23.

With the principal axis 64 of the cam plate 18 disposed at 90° (and 270°) to the center 34 of the timing mechanism, equal numbers of pistons (subjected to high pressure) will be positioned on either side of the principal axis, the clockwise torque will be equal to the anticlockwise torque generated on the cam, and the net torque of the mechanism will be zero.

Further rotation of the principal axis 64 in relation to the axis 34 will produce an unbalanced condition leaving more pistons under pressure on the opposite side of the principal axis and reversing the rotation of the mechanism. This change in the phase relationship between the timing mechanism and the principal axis of the cam 18 will not only affect the motor torque output but at the same time will affect the volume of the high pressure oil used per one revolution of the hydraulic motor. With the axis of the timing mechanism coinciding with the principal axis of the cam and with maximum motor torque output the volume of high pressure oil supplied to each cylinder will be equal to the maximum effective stroke of the piston and therefore it will be at its maximum. With the axis disposed at 90° the full discharge and suction strokes of the pistons are completely ineffective, the net difference in position of each piston at the beginning and end of the suction and discharge strokes when passing the neutral axis of the timing mechanisms being exactly the same. In this way, the volume of oil used per cylinder bore per one revolution will be proportional to the out-of-phase angle between the axis of the timing mechanism and the principal axis of the cam. With the axes coinciding and the out of phase angle zero the volume flow will be maximum. With the axes 90° out of phase, the volume flow will be reduced to zero. Thus with change in the phase relationship between axis of the timing mechanism and principal axis of the cam both the torque output of the motor and the effective motor displacement are varied.

In the arrangement shown in FIG. 1 the cam plate 18 and the valve plate 13 are connected by control shaft 55. The splined end 56 of the control shaft 55 is keyed to the cam plate 18. The other end of the control shaft 55 works in operational contact with the valve plate 30 when engaging it by the roller pin 59 keyed to the control shaft 58—55. The roller 59 is free to move in the slot 60 provided in the valve plate 13 so that a lost motion equal to the length of the slot 60 can take place between the shaft 55 and the valve plate 30. The valve plate 30 is directly connected through its cylindrical portion 41 to the control 43. With the valve plate 30 stationary and axes 34 and 64 coinciding, introduction of the high pressure oil to the kidney-shaped recess 35 will generate torque on cam plate 18 turning it in a clockwise direction as viewed from the location of control 43. With the valve plate 30 stationary, the rotation of the cam plate 18 will angularly displace the axes 34 and 64 until they will approach 90° out-of-phase position. The driving torque will then become zero and cam plate 18 will stop. This 90° out-of-phase angle can only be reached if the driven load 26 is disconnected. With the driven load 26 requiring, say, half of the maximum available torque of the motor, the revolving cam plate 18 will stop at an out-of-phase angle approaching 45°. This is the condition as illustrated in FIG. 3. Although the valve plate 30 is stationary the roller pin 33 can travel in the slot 41 permitting the principal axis of the cam plate 18 to lead the axis 34 of the timing mechanism. From this position of equilibrium any clockwise rotation of the valve plate 30 will reduce the out-of-phase angle between axes 34 and 64 and increase the torque output of the motor. This torque will progressively increase with rotation up to its maximum value with the axes 34 and 64 coinciding and roller pin 59 engaging the valve plate 13 as in FIG. 2. This increase in torque will induce revolution in shaft 23, the principal axis of the cam 18 leading the axis of the timing plate by an out-of-phase angle proportional to the magnitude of the driven load. Any sudden change in the driven load 26 will automatically change the phase relationship between axes 34 and 64 to compensate for the increase or decrease of torque.

In accordance with the present invention rotational input is supplied to the unit through 43—41 so that rotational movement of the valve plate 30 is supplied (at low power) from an external source, which, depending on the application, can be of constant speed type or of programmed varying speed type, and can be electrically hydraulically, manually or otherwise powered. With a sudden increase of this control speed, axis 34 will approach the principal axis 64 and roller pin 59 will engage the valve plate 30. In this position of maximum driving torque the cam 18 after accelerating the driven load 26 to the required speed level will (through shaft 55) disengage from valve plate 30 bringing axes 64 and 34 out of phase and reducing the driving torque.

With sudden reduction in the load 26, the cam will leave its equilibrium position and accelerated by the excess torque available will increase the out-of-phase angle automatically compensating for the reduction in the driven load. As described above the rotation of the control 43 and valve plate 30 will reproduce the same rotation in the driven load 26, the average speed of the control 43 and driven load 26 per revolution being the same but with the permissible variation of 90° in the out-of-phase relationship.

With the driven load 26 of inertia type a sudden reduction in control speed may necessitate an application of braking torque to driven load 26. This is accomplished by extending the groove 60 past the 90° out-of-phase position and therefore permitting the reversal of the direction of rotation of the hydraulic motor. When decreasing the r.p.m. of the control 43 the phase angle between the valve plate and the principal axis of the cam 18 will increase until 90° out-of-phase position is reached. Due to the kinetic energy of an inertia load 26 this out-of-phase angle will continue to increase past the 90° position, progressively increasing reversing braking torque being applied to the driven load 26. Under these conditions the oil from the space 32 is pumped back into the high pressure kidney 35, the hydraulic motor acting as a pump. With very sudden reduction in speed of rotation of control 43 the out-of-phase relationship will reach the maximum permissible overcenter position as shown by angle 66 in FIG. 4. The roller 59 will engage the valve plate 30 applying the maximum braking torque. The driven load 42 very rapidly decelerates until its rotational speed decreases sufficiently to disengage roller 59 from valve plate 30. With the drive still being in reverse a further slowing of the driven load 26 will produce an effect of reducing the phase angle, until the out-of-phase relationship of timing mechanism and principal axis of the cam will take their equilibrium position as dictated by the magnitude of the driven load 26.

Under all conditions the revolutions of control 43 will be reproduced by the hydraulic motor, the driven load working at the same rotational speed (with the arrangement shown). The horsepower required to drive the valve plate 30 is very small and (with means applying pressure difference to the valve passages) independent of driven load. The horsepower used is that due to frictional losses on the timing surfaces which are readily balanced in well known manner to reduce the friction torque to minimum. This rotation of the valve by the control at a low power level is reproduced at a very high power level in the driven load. With variation of the speed as of an electric motor at 43, there follows automatically a corresponding change in speed of the driven load 26 without the use of any involved valving, and while utilizing standard parts of a basic hydraulic motor. The advantages of this invention especially become apparent when considering its application as a constant speed drive. In such case the hydraulic motor as shown in FIG. 1 might drive an alternator at constant r.p.m., with alternator r.p.m. being exactly the same as the rotation of control 43, and with this speed maintained constant irrespective of variation in the alternator load, the phase relationship between the control and the output shaft varying proportionally to the alternator load.

Although in the above description an axial type piston fluid motor was used to demonstrate the principle of the invention any other type having a stationary cylinder barrel and a rotating cam plate and timing mechanism could be used instead.

In place of the valve plate construction shown in FIGS. 1–4 a conventional type valve plate composed of a circular plate mounted on an eccentric could be used. The control 43 would then drive the valve plate through the eccentric, the oscillations of the valve plate producing sequential timing substantially as described above, the line dividing the cylinder barrel into the high and low pressure zones revolving with the control 43. This type of valve plate would be conneted in the same manner by a shaft (55) to the cam plate 18.

There is thus provided a device of the character described capable of meeting the objects above set forth. A transmission according to the invention is able to maintain average speed of output shaft equal, or proportional if speed ratio change is desired, to the speed of independently driven motor operating the valve means, and it can do this at high torque output and with varying torque output requirements while the input is driven at constant low power and low torque level, while at the same time the device will automatically adjust proportional to torque required at the output shaft. And an added advantage of the invention is that even the fluid pressure supplied need not be constant since the unit will by varying the lead angle automatically compensate for variation in this input as well.

While I have described particular embodiments, various modifications may obviously be made without departing from the true spirit and scope of my invention which I intend to define in the appended claims.

I claim:

1. For use in a device having a stationary cylinder barrel with pistons reciprocable therein and a rotatable cam plate arranged to be driven by some of the pistons while returning others, and having a rotatable valve having passages for effecting the distribution of fluid acting on the pistons, and having an output shaft arranged to be driven by the cam plate, and having means for supplying a constant fluid pressure difference to the valve passages, the combination of a separate variable speed low power rotating control input arranged to rotate the valve, and means interposed between cam plate and valve for driving one from the other while permitting relative angular displacement of the two whereby the device may act as a continuous rotation variable speed torque multiplier with variations in input speed each producing a corresponding change in the rotational speed of the cam and any load connected thereto.

2. For use in a device comprising a stationary cylinder barrel with pistons reciprocable therein and a rotatable cam plate arranged to be driven by some of the pistons while returning others, and a rotatable valve having passages for effecting the distribution of fluid acting on the pistons, and an output shaft arranged to be driven by the cam plate, and having means for supplying a constant fluid pressure difference to the valve passages, the combination of an external low power constant speed input drive means arranged to rotate the valve, and a clearance drive control shaft means interposed between cam plate and valve, whereby the device is adapted to provide a continuously rotating substantially constant average speed high power output regardless of variation of any load driven thereby.

3. For use in a device comprising a stationary cylinder barrel with pistons reciprocable therein and a rotatable cam plate arranged to be driven by some of the pistons while returning others, and a rotatable valve having passages for effecting the distribution of fluid acting on the pistons, and an output shaft arranged to be driven by the cam plate, and having means for supplying a constant fluid pressure difference to the valve passages, the combination as in claim 2 further characterized by the clearance provided in said clearance drive control shaft means being sufficient to permit the cam plate to rotatably lead the valve plate at variant angles proportional to load torque requirement, and also sufficient to permit the cam plate to rotationably lead the valve plate at an angle sufficient to put the device in reverse drive position to affect braking whereby to maintain constant average speed of device output and of load.

4. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, the rotatable valve means comprising a valve plate rotatable about an axis, the rotatable cam being also rotatable about said axis, and a shaft means arranged to maintain angular relationship of valve plate and cam plate within predetermined limits.

5. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, said rotatable valve means comprising a valve plate rotatable about a longitudinal axis and functionally divided by an imaginary line into high pressure and exhaust areas, a rotatable cam arranged to effect the reciprocation to the pistons subjected to low pressure and to be driven by the pistons subjected to high pressure to drive the load, said rotatable cam having a face inclined to its axis of rotation to define a principal axis of inclination, independently powered rotatable control means arranged to rotate the valve means whereby the average rotational speed of the cam and load may be regulated irrespective of variation in load, and a clearance drive means for coupling valve plate and cam while permitting the cam principal axis to change its angular relation with respect to the imaginary line of the valve.

6. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, said cam being of the rotatable fixed angle face type with a principal axis inclined to the axis of rotation, there being a control shaft associated with the valve means and adapted to engage the rotatable cam to interconnect valving means and cam when an axis dividing valve means into high pressure and exhaust areas substantially coincides with said principal axis of the cam, and independently powered rotatable control means arranged to rotate the valve means whereby the average rotational speed of the cam and load may be regulated irrespective of variation in load.

7. In a pressure fluid motor or transmission for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a shaft arrangement with a clearance mechanism including a stop configured and arranged so that the cam may move the valve means in one direction while the cam is free to disengage from such valve means to reduce the displacement of the device.

8. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a clearance drive interconnecting from the cam which has a principal axis, to the valve means which has an axis separating high pressure and discharge sectors, while free to disengage the valve means from the cam in a direction to reduce the displacement of the motor and with said principal axis leading with relation to said valve axis for a predetermined direction of motor rotation, with the angle of lead proportional to driven load.

9. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a control shaft interconnecting to shift the valve means, which valve means has a center axis separating high pressure and discharge sectors responsive to positioning of the cam which has a principal axis, and an arcuate clearance associated with one of said parts whereby the cam may be disengaged from the valving means in a direction to reduce the displacement of the motor, and with said clearance extending sufficiently to permit the angle of lead between cam principal axis and valve means center axis to reach out-of-phase angle at which the device becomes inoperative as a motor.

10. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a control shaft interconnecting to shift the valve means according to cam position, and an arcuate clearance associated with the drive of one of said parts whereby the cam may be disengaged from the valving means in a direction to reduce the displacement of the motor and with said clearance extending sufficiently to permit an angle of lead between cam and valve means to extend beyond a zero output torque position beyond which position the direction of attempted rotation of the motor is reversed and it acts as a pump to effect a braking action.

11. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a control shaft interconnecting to shift the valve means which has a zero axis separating high pressure and discharge sectors, responsive to cam which has a principal axis, and an arcuate clearance associated with the drive of one of said parts and which clearance terminates at a first end at a position corresponding to principal axis and zero axis coincidence whereby the cam may be disengaged from the valving means in a direction to reduce the displacement of the motor and with said clearance extending to its second end displaced from the first sufficiently to permit the angle of lead between cam principal axis and valve means zero axis to reach a zero output torque position at 90° angle of lead and to go therebeyond a predetermined number of degrees to permit the motor to act as a brake up to a maximum selected lead angle which limits maximum braking torque when cam and valve means are again in driving engagement but in an opposite torque application sense at the second or final end of the clearance.

12. In a pressure fluid motor for driving a load and of the type having a stationary cylinder barrel having cylinder bores and pistons arranged to reciprocate therein, the combination of a rotatable valve means arranged to selectively effect connection of high pressure fluid and low pressure exhaust to the individual cylinder bores, a rotatable cam arranged to effect the reciprocation of the pistons subjected to low pressure and to be driven by the pistons subjected to high pressure to drive the load, independently powered rotatable control means arranged to rotate the valve means whereby the average rotational speed of the cam and load may be regulated irrespective of variation in load, and a shaft interconnecting to adjust the valving means, which has a zero axis separating high pressure and discharge sectors, from the cam, which has a principal axis, and means including an arcuate clearance slot associated with the drive of one of said parts and a roller in said slot and associated with another of said parts whereby the cam may be disengaged from the valving means in a direction to reduce the displacement of the motor, with said clearance slot extending sufficiently to permit the angle of lead between cam principal axis and valve means zero axis to reach a zero output torque position at 90° angle of lead and to go therebeyond a predetermined number of degrees to permit the motor to act as a brake up to a maximum selected lead angle which limits maximum braking torque when cam and valve means again are in driving engagement but in an opposite torque application sense with the roller at the final end of the clearance .

*13. A fluid pressure motor comprising a rotatable output shaft, a power cylinder, a piston reciprocable in said cylinder and arranged to drive said output shaft on its outward stroke, said motor including an exhaust passageway and an input passageway adapted to be connected to a source of fluid under pressure, valve means movable through a cycle to connect said cylinder alternately to said input passageway and to said exhaust passageway, a separate motor means connected to said valve means to move the same through its cycle at a rate determined by the speed of said separate motor means, said output shaft being free to shift the phase of said piston relative to the phase of said valve means, and stop means to limit such phase shifting in one direction and transmit torque from said separate motor means to said output shaft.*

*14. A fluid pressure motor comprising a rotatable output shaft, a stationary cylinder barrel having a plural number of cylinder bores, pistons reciprocable in said cylinder bores, a rotatable cam plate connected to drive said output shaft, said cam plate being arranged to be rotated by said pistons on their outward strokes and to move said pistons on their inward strokes, said motor having an input passageway adapted to be connected to a source of fluid under pressure and having an exhaust passageway, valve means controlling communication between said cylinders and said passageways and movable through a cycle to connect each of said cylinders in sequence alternately to said input passageway and to said exhaust passageway, separate motor means connected to drive said valve means through its cycle at a predetermined rate, said output shaft being free to shift relative to said separate motor means to vary the phase relationship between said valve means and said pistons.*

*15. For use in a fluid motor having a stationary cylinder barrel having cylinder bores with pistons reciprocable therein and a rotatable cam plate arranged to be driven by some of the pistons while returning others, an output shaft driven by said cam plate and adapted to drive a load, a rotatable valve plate for effecting the distribution of fluid to said cylinder bores, said valve plate having portions defining high pressure and low pressure zones, and a rotatable input shaft angularly movable with respect to said output shaft and adapted to rotate said valve plate to provide sequential timing between said pressure zones and said cylinder bores whereby said cam plate is rotated in response to the rotation of said input shaft.*

*16. For use in a device having a stationary cylinder barrel having cylinder bores with pistons reciprocable therein and a rotatable cam plate arranged to be driven by some of the pistons while returning others, an output shaft driven by said cam plate and adapted to drive a load, a cyclically operable valve plate for effecting the sequential distribution of fluid to said cylinder bores, said valve plate having portions defining a high pressure zone and a low pressure zone, and a rotatable input shaft angularly movable with respect to said output shaft and adapted to cyclically actuate said valving means to provide sequential timing between said pressure zones and said cylinder bores whereby said cam plate is rotated to apply to said output shaft a torque proportional to the cyclic phase difference between said input shaft and said output shaft.*

*17. For use in a device having a stationary cylinder barrel having cylinder bores with pistons reciprocable*

*therein and a rotatable cam plate arranged to be driven by some of the pistons while returning others, an output shaft driven by said cam plate and adapted to drive a load, cyclically operable valve means for effecting the sequential distribution of fluid to said cylinder bores, said valve means having portions defining a high pressure zone and a low pressure zone, a rotatable input shaft angularly movable with respect to said output shaft and adapted to cyclically actuate said valve means to provide sequential timing between said pressure zones and said*

*cylinder bores whereby said cam plate is rotated to apply to said output shaft a torque proportional to the cyclic phase difference between said input shaft and said output shaft, and means to limit the amount of relative angular movement between said input shaft and said output shaft.*

References Cited in the file of this patent or the original patent

UNITED STATES PATENTS

| | | |
|---|---|---|
| 2,285,476 | Wahlmark | June 9, 1942 |
| 2,861,552 | Creighton et al. | Nov. 25, 1958 |